UNITED STATES PATENT OFFICE.

CHARLES THOMAS KINGZETT, OF TREVENA, AMHURST PARK, COUNTY OF MIDDLESEX, ENGLAND.

DISINFECTANT.

SPECIFICATION forming part of Letters Patent No. 371,074, dated October 4, 1887.

Application filed March 15, 1887. Serial No. 230,958. (No specimens.)

*To all whom it may concern:*

Be it known that I, CHARLES THOMAS KINGZETT, F. I. C., F. C. S., vice-president Society of Public Analysts, a subject of the Queen of Great Britain, residing at Trevena, Amhurst Park, in the county of Middlesex, England, have invented certain new and useful Improvements in the Production of Solutions for Use as Antiseptics, Disinfectants, Deodorants, Oxidants, and General Sanitary Reagents, of which the following is a specification.

In the course of investigations which I have conducted, and accounts of which have been published from time to time, I have ascertained that when spirits or oil of turpentine or resin spirit or cymene or any essential oil containing a terpene ($C_{10}H_{16}$) is oxidized by air, oxygen, or ozone in the presence of water there is obtained an aqueous solution containing peroxide of hydrogen, a substance which exhibits peculiar antiseptic and oxidizing properties, and that this substance is accompanied by others of a camphoraceous character, which also exhibit antiseptic properties.

My present invention relates, first, to the process of manufacture and the products thereof; and it consists in the employment of sea-water, either natural or artificial, (made by dissolving the substances found in sea-water in ordinary fresh water,) instead of ordinary water. I have discovered that by the use of sea-water the peroxide of hydrogen which is produced in the process is not only not interfered with, but is actually increased in quantity, and that the solution is more stable than that which is made with fresh water. In other words, the peroxide of hydrogen is preserved from chemical change. Further, by the use of sea-water new properties are given to the product, its antiseptic and preservative effects being thereby increased, and the solution becomes peculiarly applicable to a number of new sanitary and medical purposes.

As an alternative to the use of the solution of peroxide of hydrogen as prepared by the oxidation of turpentine or other suitable hydrocarbon, I can use peroxide of hydrogen as prepared by other processes for admixture with the antiseptics and disinfectants.

Having now particularly described and ascertained the nature of my said invention and in what manner the same is to be performed, I declare that what I claim is—

1. The process hereinbefore described of manufacturing antiseptic, disinfecting, deodorizing, or oxidizing solutions, consisting in oxidizing spirit or oil of turpentine (or other essential oil containing a terpene) in presence of sea-water, either natural or artificial, substantially as set forth.

2. The herein-described composition of matter to be used for antiseptic, disinfecting, deodorizing, or oxidizing substances, consisting of sea-water (either natural or artificial) and containing peroxide of hydrogen in solution, substantially as set forth.

CHARLES THOMAS KINGZETT.

Witnesses:
    HERBERT E. DALE,
    ARTHUR R. SKERTEN,
*Both of No. 17 Gracechurch St., London, England.*